United States Patent
Kagehisa et al.

(10) Patent No.: US 7,494,715 B2
(45) Date of Patent: Feb. 24, 2009

(54) STEEL PLATE REINFORCING SHEET (75) Inventors: Yuki Kagehisa, Osaka (JP); Fuyuki Eriguchi, Osaka (JP); Hideki Akamatsu, Osaka (JP)

(73) Assignee: Nitto Denko Corporation, Osaka (JP)

( * ) Notice: Subject to any disclaimer, the term of this patent is extended or adjusted under 35 U.S.C. 154(b) by 568 days.

(21) Appl. No.: 11/147,335

(22) Filed: Jun. 8, 2005

(65) Prior Publication Data
US 2005/0276984 A1 Dec. 15, 2005

(30) Foreign Application Priority Data
Jun. 10, 2004 (JP) ............... 2004-172912

(51) Int. Cl.
*B32B 15/092* (2006.01)
*B32B 3/30* (2006.01)
*B32B 15/18* (2006.01)
*B32B 25/00* (2006.01)
*B32B 27/38* (2006.01)
*C08L 63/00* (2006.01)

(52) U.S. Cl. .............. 428/416; 428/134; 428/136; 428/418; 428/457; 428/461; 428/462; 428/500

(58) Field of Classification Search ............. 428/134, 428/136, 416, 418, 457, 461, 462, 500
See application file for complete search history.

(56) References Cited

U.S. PATENT DOCUMENTS 3,506,533 A * 4/1970 Berner .................. 428/152
6,387,470 B1 * 5/2002 Chang et al. ............ 428/121
6,444,713 B1 * 9/2002 Pachl et al. ............. 521/54

FOREIGN PATENT DOCUMENTS

| CA | 2027116 | 4/1991 |
|---|---|---|
| EP | 0 424 312 A | 4/1991 |
| EP | 0 527 484 A | 2/1993 |
| EP | 1 493 558 A | 1/2005 |
| EP | 1 531 040 A | 5/2005 |
| GB | 2 204 341 A | 11/1988 |
| JP | 2812789 | 3/1992 |
| JP | 05-111973 | 5/1993 |
| JP | 09-099512 * | 4/1997 |
| JP | 2000-103008 | 4/2000 |
| JP | 2002-283526 | 10/2002 |

* cited by examiner

*Primary Examiner*—Michael J Feely
(74) *Attorney, Agent, or Firm*—Jean C. Edwards, Esq.; Akerman Senterfitt (57) ABSTRACT

A steel plate reinforcing sheet that can reduce distortions of the steel plate without reducing its reinforcing property and can also prevent abrupt deformations at end portions thereof with respect to a direction extending along a curving direction of a curved steel plate. The steel reinforcing sheet features a generally rectangular shape, as defined by a length and a width, and two end portions on either side of an imaginary line which bisects the length of the steel plate reinforcing sheet. The steel plate reinforcing sheet is a laminate including a restricting layer and a reinforcing layer, wherein each end portion of the restricting layer includes at least one slit. Each slit extends directly or indirectly across the entire width of the steel plate reinforcing sheet, and the two slits closest to the imaginary line define a minimum distance between slits. The minimum distance is parallel to the length of the steel plate reinforcing sheet and equivalent to 40% or more of the length of the steel plate reinforcing sheet.

17 Claims, 7 Drawing Sheets

STEEL PLATE REINFORCING SHEET

BACKGROUND OF THE INVENTION

1. Field of the Invention

The present invention relates to a steel plate reinforcing sheet and, more particularly, to a steel plate reinforcing sheet to be adhesively bonded to a steel plate used in a variety of industrial machines, such as transportation machines, to reinforce the steel plate.

2. Description of the Prior Art

In general, the steel plate for a shell of an automotive vehicle is manufactured in the form of a thin sheet having a thickness generally in the range of 0.6 mm to 0.8 mm, for reduction in weight of a vehicle body. As is known, the steel plate reinforcing sheet used for reinforcing the steel plate comprises a restricting layer and a reinforcing layer. In use, the steel plate reinforcing sheet is adhesively bonded to the inside of the steel plate and then the reinforcing layer is foamed.

A thermally curable adhesive sheet for reinforcing a thin steel plate was proposed as the steel plate reinforcing sheet. It has a structure wherein uncured adhesive layers of epoxy resin composition having an adhesiveness at room temperature and containing a thermally decomposable foaming agent are laminated in layers on a base material layer of uncured epoxy resin composition (Cf. JP Laid-open (Unexamined) Patent Publication No. 2002-283526, for example).

However, this thermally curable adhesive sheet for reinforcing the thin steel plate has the disadvantage that when cooled, distortions caused by difference in thermal expansion coefficient between the laminated adhesive layers occur in the steel plate (adherend).

On the other hand, a method of reducing those distortions was also proposed, wherein slits are formed in a diffusion restraining sheet of the reinforcing sheet in such a relation that they are extended orthogonally to a longitudinal direction of the sheet and staggered with spaced intervals in the longitudinal direction, whereby restraint of the diffusion of the thermally-curable foaming resin of the diffusion restraining sheet is relieved to prevent distortions of an outer panel caused by the expansion difference when the foaming resin is thermally foamed (Cf. JP Laid-open (Unexamined) Patent Publication No. 2000-103008, for example).

The formation of the staggered slits can provide the advantage of reducing the distortions of the steel plate, while on the other hand, it provides the disadvantage of reducing the reinforcing property of the steel plate reinforcing sheet.

Also, when the curved steel plate, such as a door panel, is reinforced by the steel plate reinforcing sheet, abrupt deformation occurs at end portions of the steel plate reinforcing sheet with respect to a direction extending along the curving direction of the steel plate after the reinforcing layer is foamed. This is because flexural rigidity of the steel plate reinforcing sheet in a direction perpendicular to the curving direction of the steel plate increases, so that the stress is concentrated on the end portions of the steel plate reinforcing sheet. Accordingly, relieving the stress from the end portions of the steel plate reinforcing sheet with respect to the direction extending along the curving direction of the steel plate is required for preventing this abrupt deformation.

SUMMARY OF THE INVENTION

It is an object of the present invention to provide a steel plate reinforcing sheet that can reduce distortions of the steel plate without reducing its reinforcing property and can also prevent abrupt deformations at end portions thereof with respect to a direction extending along a curving direction of a curved steel plate.

The present invention provides a steel plate reinforcing sheet comprising a restricting layer and a reinforcing layer, wherein slits are formed in at least both end portions of the restricting layer to extend over an entire length of the restricting layer with respect to a direction substantially orthogonal to a direction in which the end portions confront each other and also arranged so that a length defined between the slits can be 40% or more of a total length of the steel plate reinforcing sheet with respect to a direction parallel to the length between the slits.

In the steel plate reinforcing sheet of the present invention, it is preferable that the slits are arranged so that the length between the slits can be 50% or more, or preferably 60% or more, of the total length of the steel plate reinforcing sheet with respect to the direction parallel to the length between the slits.

In the steel plate reinforcing sheet of the present invention, it is preferable that the reinforcing layer is in the form of a sheet of foaming composition which is foamed by heating, the foaming composition comprises a rubber, an epoxy resin and a foaming agent.

In the steel plate reinforcing sheet of the present invention, it is preferable that the rubber is styrene synthetic rubber.

In the steel plate reinforcing sheet of the present invention, it is preferable that the styrene synthetic rubber is styrene-butadiene rubber.

In the steel plate reinforcing sheet of the present invention, it is preferable that the mixing ratio of the epoxy resin is in the range of 30-70 parts by weight per 100 parts by weight of the total of the rubber and the epoxy resin.

In the steel plate reinforcing sheet of the present invention, it is preferable that the foaming composition further includes a compatibilizing agent, and the compatibilizing agent is epoxy-modified rubber.

In the steel plate reinforcing sheet of the present invention, it is preferable that the mixing ratio of the compatibilizing agent is in the range of 1-20 parts by weight per 100 parts by weight of the total of the rubber and the epoxy resin.

In the steel plate reinforcing sheet of the present invention, it is preferable that the slits have depths of one-third or more of the thickness of the restricting layer.

In the steel plate reinforcing sheet of the present invention, it is preferable that the slits have widths of 20 mm or less.

In the steel plate reinforcing sheet of the present invention, it is preferable that the shape of the slits is selected from a parallel-lines shape, a wave-shape, a saw-tooth shape, a tapered shape, or a recessed shape as viewed from top of the restricting layer.

In the steel plate reinforcing sheet of the present invention, it is preferable that the two slits formed in the end portions of the steel plate reinforcing sheet are formed to have a symmetrical shape.

In the steel plate reinforcing sheet of the present invention, it is preferable that the number of the slits is two or more.

In the steel plate reinforcing sheet of the present invention, it is preferable that the shape of the slits is the tapered shape as viewed from top of the restricting layer.

In the steel plate reinforcing sheet of the present invention, it is preferable that the shape of the slits is the recessed shape as viewed from top of the restricting layer.

According to the steel plate reinforcing sheet of the present invention, the slits are formed in both end portions of the restricting layer to extend over an entire length of the restricting layer with respect to a direction substantially orthogonal to a direction in which the both end portions confront each other so that a length defined between the slits can be 40% or more of a total length of the steel plate reinforcing sheet with respect to a direction parallel to the length between the slits. This arrangement can produce the result that when the steel plate reinforcing sheet is adhesively bonded to the curved steel plate so that the slits extend along a direction substantially orthogonal to the curving direction of the curved steel plate and then the reinforcing layer is foamed, in order to reinforce the curved steel plate, the slits can allow the stress concentrated on the end portions of the steel plate reinforcing sheet to be relieved from those end portions. As a result, even when the steel plate reinforcing sheet is applied to the curved steel plate, abrupt deformation of the end portions of the steel plate reinforcing sheet with respect to the direction extending along the curving direction of the curved steel plate can be prevented. This can provide reduction of distortions of the steel plate, while providing the reliable reinforcement.

BRIEF DESCRIPTION OF THE DRAWINGS

In the drawings:

(a) illustrating the process of preparing a steel plate reinforcing sheet and peeling off an exfoliate paper from the same reinforcing sheet;

(b) illustrating the process of adhesively bonding the steel plate reinforcing plate to the steel plate and;

(c) illustrating the process of foaming and thermally curing the steel plate reinforcing plate by heating, FIG. 3 shows the steel plate reinforcing sheet of Example 1, (a) showing a sectional view of the steel plate reinforcing sheet, taken along a direction of the opposite end portions where slits are formed being opposite to each other (or a sectional view taken along line A-A of (b)), and (b) showing a plan view of the same, FIG. 4 shows the steel plate reinforcing sheet of Example 2, (a) showing a sectional view of the steel plate reinforcing sheet, taken along a direction of the opposite end portions where slits are formed being opposite to each other (or a sectional view taken along line A-A of (b)), and (b) showing a plan view of the same, FIG. 5 shows the steel plate reinforcing sheet of Example 3, (a) showing a sectional view of the steel plate reinforcing sheet, taken along a direction of the opposite end portions where slits are formed being opposite to each other (or a sectional view taken along line A-A of (b)), and (b) showing a plan view of the same, FIG. 6 shows the steel plate reinforcing sheet of Example 4, (a) showing a sectional view of the steel plate reinforcing sheet, taken along a direction of the opposite end portions where slits are formed being opposite to each other (or a sectional view taken along line A-A of (b)), and (b) showing a plan view of the same, FIG. 10 shows the steel plate reinforcing sheet of Comparative Example 4, (a) showing a sectional view of the steel plate reinforcing sheet, taken along a direction of the opposite end portions where slits are formed being opposite to each other (or a sectional view taken along line A-A of (b)), and (b) showing a plan view of the same, and FIG. 11(*a*) is a perspective view of an aluminum panel (A1050) used in Evaluation, and (b) is an illustration showing a relationship between displacement magnitude and position displaced.

DETAILED DESCRIPTION OF THE PREFERRED EMBODIMENT

A steel plate reinforcing sheet of the present invention comprises a restricting layer and a reinforcing layer.

The restricting layer serves to provide tenacity for the reinforcing layer after foamed (hereinafter it is referred to "foam layer"). It is preferable that the restricting layer is in the form of a sheet and is formed of lightweight and thin-film material to be adhesively bonded firmly and integrally with the foam layer. The materials that may be used for the restricting layer include, for example, glass fiber cloth, resin-impregnated glass fiber cloth, synthetic resin unwoven cloth, metal foil, and carbon fiber.

The glass fiber cloth is a cloth formed of glass fibers, and a known glass fiber cloth can be used. The resin-impregnated glass fiber cloth is the above mentioned glass fiber cloth impregnated with synthetic resin such as thermosetting resin, or thermoplastic resin, and a known resin-impregnated glass fiber cloth can be used. The thermosetting resins that may be used include, for example, epoxy resin, urethane resin, melamine resin, and phenol resin. The thermoplastic resins that may be used include, for example, vinyl acetate resin, ethylene vinyl acetate copolymer (EVA), vinyl chloride resin, and EVA-vinyl chloride resin copolymer. The thermosetting resin cited above and the thermoplastic resin cited above may be used in combination (e.g. combination of melamine resin and vinyl acetate resin).

The metal foils that may be used include, for example, known metal foils such as an aluminum foil and a steel foil.

Of these materials, the glass fiber cloth and the resin-impregnated glass fiber cloth are preferably used, in terms of weight, degree of adhesion, strength, and cost.

The restricting layer has a thickness, for example, in the range of 0.05 to 0.40 mm, or preferably in the range of 0.10-0.30 mm.

The reinforcing layer is in the form of a sheet of foaming composition which is foamed by heating. The foaming composition comprises for example a rubber, an epoxy resin and a foaming agent.

No particular limitation is imposed on the rubber. The rubbers that may be used include, for example, styrene synthetic rubber, such as styrene-butadiene rubber (e.g. styrene-butadiene random copolymer, styrene-butadiene-styrene block copolymer, styrene-ethylene-butadiene copolymer, and styrene-ethylene-butadiene-styrene block copolymer), styrene-isoprene rubber (e.g. styrene-isoprene-styrene block copolymer), and styrene-isoprene-butadiene rubber, and polybutadiene rubber (1,4-polybutadiene rubber, the same applies to the following), syndiotactic-1,2-polybutadiene rubber, acrylonitrile-butadiene rubber, polyisoprene rubber, chloroprene rubber, isobutylene-isoprene rubber, nitrile rubber, butyle rubber, and natural rubber.

These rubbers may be used alone or in combination. Of these rubbers, styrene synthetic rubber, or preferably styrene-butadiene rubber, is preferably used in terms of reinforcement and adhesion to an oiled surface of the steel plate. The styrene synthetic rubber has a styrene content of e.g. not more than 50 weight %, or preferably not more than 35 weight %.

The number average molecular weight of this rubber is not less than 30,000, or preferably ranges from 50,000 to 1,000,000. The number of average molecular weight of less than 30,000 may cause reduction of the adhesion of the steel plate reinforcing sheet particularly to the oiled steel plate.

Also, the Mooney viscosity of this rubber ranges for example from 20 to 60 (ML1+4, at 100° C.), or preferably from 30 to 50 (ML1+4, at 100° C.)

The mixing ratio of this rubber is for example in the range of 30-70 parts by weight, or preferably 40-60 parts by weight, per 100 parts by weight of the total of rubber and epoxy resin. The mixing ratio of the rubber of less than that may cause reduction of adhesion of the steel plate reinforcing sheet particularly to the oiled steel plate. On the other hand, the mixing ratio of the rubber of more than that may cause reduction of reinforcement of the steel plate reinforcing sheet.

No particular limitation is imposed on the epoxy resin. The epoxy resins that may be used include, for example, aromatic epoxy resin, such as bisphenol epoxy resin (e.g. bisphenol A type epoxy resin, dimer acid modified bisphenol A type epoxy resin, bisphenol F type epoxy resin, bisphenol S type epoxy resin, etc.), novolak epoxy resin (e.g. phenol novolak epoxy resin, cresol novolak epoxy resin, etc.), and naphthalene epoxy resin, cyclo aliphatic epoxy resin, ring containing nitrogen epoxy resin, such as triglycidyl isocyanurate and hydantoin epoxy resin, hydrogenated bisphenol A type epoxy resin, aliphatic epoxy resin, glycidyl ether epoxy resin, biphenyl epoxy resin of a mainstream of low water absorption curing type, dicyclo ring type epoxy resin. These may be used alone or in combination. Of these epoxy resins, aromatic epoxy resin, especially, bisphenol epoxy resin is preferably used, in terms of reinforcements.

Epoxy equivalent of this epoxy resin is for example in the range of 150-1,000 g/equiv., or preferably in the range of 200-800 g/equiv. The epoxy equivalent can be calculated from concentration of oxirane oxygen measured by the titration using hydrogen bromide.

The mixing ratio of the epoxy resin is for example in the range of 30-70 parts by weight, or preferably 40-60 parts by weight, per 100 parts by weight of the total of rubber and epoxy resin. The mixing ratio of the epoxy resin of less than that may cause reduction of reinforcement of the steel plate reinforcing sheet. On the other hand, the mixing ratio of the epoxy resin of more than that may cause the reduction of adhesion of the steel plate reinforcing sheet to the oiled steel plate.

The foaming agents that may be used include, for example, an inorganic foaming agent and an organic foaming agent.

The inorganic foaming agents that may be used include, for example, ammonium carbonate, ammonium hydrogen carbonate, sodium hydrogen carbonate, ammonium nitrite, sodium borohydride, and azides.

The organic foaming agents that may be used include, for example, an N-nitroso compound (N,N'-dinitrosopentamethylenetetramine, N,N'-dimethyl-N,N'-dinitrosoterephthalamide, etc.), an azoic compound (e.g. azobis isobutyronitrile, azodicarboxylic amide, barium azodicarboxylate, etc.), alkane fluoride (e.g. trichloromonofluoromethane, dichloromonofluoromethane, etc.), a hydrazine compound (e.g. paratoluene sulfonyl hydrazide, diphenylsulfone-3,3'-disulfonyl hydrazide, 4,4'-oxybis (benzene sulfonyl hydrazide), allylbis (sulfonyl hydrazide), etc.), a semicarbazide compound (e.g. p-toluylenesulfonyl semicarbazide, 4,4'-oxybis (benzene sulfonyl semicarbazide, etc.), and a triazole compound (e.g. 5-morphoryl-1,2,3,4-thiatriazole, etc.).

The foaming agents may be in the form of thermally expansible microparticles comprising microcapsules formed by encapsulating thermally expansive material (e.g. isobutane, pentane, etc.) in a microcapsule (e.g. microcapsule of thermoplastic resin, such as vinylidene chloride, acrylonitrile, acrylic ester, and methacrylic ester). Commercially available products, such as Microsphere® (available from Matsumoto Yushi-Seiyaku Co., Ltd.), may be used as the thermally expansible microparticles.

These may be used alone or in combination. Of these foaming agents, 4,4'-oxybis (benzene sulfonyl hydrazide) is preferably used in terms of less susceptible to external factors and foaming stability.

The mixing ratio of the foaming agent is for example in the range of 0.5-10 parts by weight, or preferably 1-5 parts by weight, per 100 parts by weight of the total of rubber and epoxy resin. The mixing ratio of the foaming agent of less than that may cause insufficient foaming, so that it causes reduction in thickness and thus in reinforcement of the steel plate reinforcing sheet. On the other hand, the mixing ratio of the foaming agent of more than that may cause reduction of density and thus in reinforcement of the steel plate reinforcing sheet.

It is preferable that the foaming composition includes a compatibilizing agent, in addition to the component cited above. The compatibilizing agent is used to compatibilize the rubber and the epoxy resin cited above. The mixing of the compatibilizing agent can provide further improved adhesiveness and reinforcement.

No particular limitation is imposed on the compatibilizing agent. For example, epoxy-modified rubber can be cited as the compatibilizing agent. The epoxy-modified rubber is a rubber produced by modifying the rubber at an end of molecular chain or in a molecular chain thereof with an epoxy group. Epoxy equivalent of the epoxy-modified rubber preferably used is for example in the range of 100-10,000 g/equiv., or preferably in the range of 400-3,000 g/equiv. The rubber can be modified with an epoxy group by using a known method. For example, an epoxidizing agent, such as peracids and hydroperoxides, is allowed to react with a double bond in the rubber in an inert solvent.

The epoxy-modified rubbers that may be used include, for example, epoxy-modified rubber wherein an epoxy group is introduced in a B polymer block of an A-B type block copolymer or an A-B-A type block copolymer (A represents a styrene polymer block, and B represents conjugated diene polymer block, such as a butadiene polymer block and an isoprene polymer block).

To be more specific, for example, epoxy-modified styrene. Butadiene.styrene block copolymer, epoxy-modified styrene.ethylene. Butadiene.styrene block copolymer, and epoxy-modified styrene.isoprene. styrene block copolymer can be used. These may be used alone or in combination.

Of these epoxy-modified rubbers, epoxy-modified styrene•butadiene•styrene block copolymer is preferably used in terms of ensuring the compatibility of the reinforcement with the adhesiveness.

In the A-B type block copolymer or the A-B-A type block copolymer, it is preferable that the weight average molecular weight of an A block copolymer, which is a styrene copolymer block, is on the order of 1,000 to 10,000, and the glass-transition temperature of the same is 7° C. or more. Also, it is preferable that the weight average molecular weight of a B block copolymer, which is a conjugated diene polymer block, is on the order of 10,000 to 500,000, and the glass-transition temperature of the same is −20° C. or less. It is preferable that a weight ratio of the A block copolymer to the B block copolymer (A block copolymer/B block copolymer) is in the range of 2/98-50/50, or preferably in the range of 15/85-30/70.

The mixing ratio of the compatibilizing agent is for example in the range of 1-20 parts by weight, or preferably 5-15 parts by weight, per 100 parts by weight of the total of rubber and epoxy resin. The mixing ratio of the compatibilizing agent of less than this may not produce improvement in reinforcement and adhesiveness of the steel plate reinforcing sheet. On the other hand, the mixing ratio of the compatibilizing agent of more than this may cause reduction of adhesion of the steel plate reinforcing sheet under a low temperature in particular.

Further, it is preferable that this foaming composition includes a rubber cross-linking agent and/or an epoxy resin curing agent, in addition to the components cited above. The containing of the rubber cross-linking agent and/or the epoxy resin curing agent can provide improved reinforcement.

A known rubber cross-linking agent (a vulcanizing agent) that can allow to cross-link the rubber or the epoxy-modified rubber by heating can be used as the rubber cross-linking agent. The rubber cross-linking agents that may be used include, for example, sulfur, sulfur compounds, selenium, magnesium oxide, lead monoxide, organic peroxides (e.g. dicumyl peroxide, 1,1-ditert-butyl-peroxy-3,3-5-trimethyl-cyclohexane, 2,5-dimethyl-2,5-ditert -butyl-peroxyhexane, 2,5-dimethyl-2,5-ditert-butyl-peroxyhexyne, 1,3-bis (tert-butyl-peroxy-isopropyl)benzene, tert-butyl-peroxy-ketone, and tert-butyl-peroxy-benzoate), polyamines, oximes (e.g. p-quinone dioxime and p,p'-dibenzoyl quinone dioxime, etc.), nitroso compounds (e.g. p-dinitroso benzene, etc.), resins (e.g. alkyl phenol-formaldehyde resin, melamine-formaldehyde condensate), and ammonium salts (e.g. ammonium benzoate, etc.).

These may be used alone or in combination. Of these rubber cross-linking agents, sulfur is preferably used in terms of the curing property and the reinforcement.

The mixing ratio of the rubber cross-linking agent is for example in the range of 1-20 parts by weight, or preferably 2-15 parts by weight, per 100 parts by weight of the total of rubber and epoxy resin. The mixing ratio of the rubber cross-linking agent of less than this may cause reduction in reinforcement of the steel plate reinforcing sheet. On the other hand, the mixing ratio of the rubber cross-linking agent of more than this may cause reduction of adhesion of the steel plate reinforcing sheet and may cause cost-defectiveness.

A known epoxy resin curing agent can be used as the epoxy resin curing agent. The epoxy resin curing agents that may be used include, for example, amine compounds, acid anhydride compounds, amide compounds, hydrazide compounds, imidazole compounds, and imidazoline compounds. In addition to these, phenol compounds, urea compounds, and polysulfide compounds can be cited as the epoxy resin curing agent.

The amine compounds that may be used include, for example, ethylenediamine, propylenediamine, diethylenetriamine, triethylenetetramine, amine adducts thereof, metaphenylenediamine, diaminodiphenylmethane, and diaminodiphenylsulfone.

The acid anhydride compounds that may be used include, for example, phthalic anhydride, maleic anhydride, tetrahydrophthalic anhydride, hexahydrophthalic anhydride, methyl nadic anhydride, pyromelletic anhydride, dodecenylsuccinic anhydride, dichlorosuccinic anhydride, benzophenonetetracarboxylic anhydride, and chlorendic anhydride.

The amide compounds that may be used include, for example, dicyandiamide and polyamide.

The hydrazide compounds that may be used include, for example, dihydrazide.

The imidazole compounds that may be used include, for example, methyl imidazole, 2-ethyl-4-methyl imidazole, ethyl imidazole, isopropyl imidazole, 2,4-dimethylimidazole, phenylimidazole, undecylimidazole, heptadecylimidazole, and 2-phenyl-4-methylimidazole.

The imidazoline compounds that may be used include, for example, methylimidazoline, 2-ethyl-4-methylimidazoline, ethylimidazoline, isopropylimidazoline, 2,4-dimehtylimidazoline, phenylimidazoline, undecylimidazoline, heptadecylimidazoline, and 2-phenyl-4-methyl imidazoline.

These may be used alone or in combination. Of these epoxy resin curing agents, dicyandiamide is preferably used in terms of adhesiveness.

The mixing ratio of the epoxy resin curing agent is for example in the range of 0.5-15 parts by weight, or preferably 1-10 parts by weight, per 100 parts by weight of the total of rubber and epoxy resin. The mixing ratio of the epoxy resin curing agent of less than this may cause reduction in reinforcement of the steel plate reinforcing sheet. On the other hand, the mixing ratio of the epoxy resin curing agent of more than this may cause reduction in storage stability of the steel plate reinforcing sheet.

In addition to the components cited above, a foam auxiliary agent, a cross-linking accelerator, a curing accelerator, a filler, and a tackifier may be included in the foaming composition. Further, if desired, known additives, such as, for example, pigment (e.g. carbon black, etc.), a thixotropic agent (e.g. montmorillonite, etc.), lubricant (e.g. stearic acid, etc.), an antiscorching agent, a stabilization agent, a softening agent, a plasticizer, an antiaging agent, an antioxidant, an ultraviolet absorber, a coloring agent, a fungicide agent, and a flame retardant, may be included in the foaming composition in a proper proportion.

The foam auxiliary agents that may be used include, for example, zinc stearate, a urea compound, a salicylic acid compound, and a benzoic acid compound. These foam auxiliary agents may be used alone or in combination. The mixing ratio of the foam auxiliary agent is for example in the range of 0.5-10 parts by weight, or preferably 1-5 parts by weight, per 100 parts by weight of the total of rubber and epoxy resin.

The cross-linking accelerators that may be used include, for example, zinc oxide, dithiocarbamic acids, thiazoles, guanidines, sulfenamides, thiurams, xanthogenic acids, aldehyde ammonias, aldehyde amines, and thioureas. These cross-linking accelerators may be used alone or in combination. The mixing ratio of the cross-linking accelerator is for example in the range of 1-20 parts by weight, or preferably 3-15 parts by weight, per 100 parts by weight of the total of rubber and epoxy resin.

The curing accelerators that may be used include, for example, imidazoles, tertiary amines, phosphorus compounds, quaternary ammonium salts, and organic metal salts. These curing accelerators may be used alone or in combination. The mixing ratio of the curing accelerator is for example in the range of 0.5-20 parts by weight, or preferably 1-10 parts by weight, per 100 parts by weight of the total of rubber and epoxy resin.

The fillers that may be used include, for example, calcium carbonate (e.g. heavy calcium carbonate, light calcium carbonate, and Hakuenka® (colloidal calcium carbonate), etc.), talc, mica, clay, mica powder, bentonite, silica, alumina, aluminum silicate, titanium oxide, acetylene black, and aluminum powder. These fillers may be used alone or in combination. The mixing ratio of the filler is for example in the range of 50-150 parts by weight, or preferably 75-125 parts by weight, per 100 parts by weight of the total of rubber and epoxy resin.

The tackifiers that may be used include, for example, rosin resin, terpene resin (e.g. terpene-aromatic liquid resin, etc.), cumarone-indene resin, and petroleum resin (e.g. C5/C9 petroleum resin). These tackifiers may be used alone or in combination. The mixing ratio of the tackifier is for example in the range of 10-200 parts by weight, or preferably 20-150 parts by weight, per 100 parts by weight of the total of rubber and epoxy resin.

The foaming composition can be prepared in the form of kneaded material by mixing the components cited above in the mixing ratios specified above and kneading them by using a mixing roll, a pressure kneader, or an extruder, for example, though not limited thereto.

It is preferable that the kneaded material thus obtained is prepared to have a flow tester viscosity (60° C., 24 kg load) for example in the range of 1,000-5,000 Pa·s, or preferably in the range of 1,500-4,000 Pa·s.

It is preferable that the kneaded material is prepared so that a volume expansion ratio of the kneaded material (foaming composition) ranges preferably from 1.5 to 4.0 times, or further preferably from 2.0 to 3.5 times, when foamed, and also a density of the foam in the foam layer (weight(g) of foam/volume($cm^3$) of foam ($g/cm^3$)) is for example in the range of preferably 0.2-0.8 $g/cm^3$, or further preferably in the range of 0.3-0.7 $g/cm^3$.

Thereafter, the kneaded material thus produced is rolled for example by calendaring, extrusion or press molding under temperature under which the foaming agent is not substantially decomposed, to form the reinforcing layer in sheet form. Then, the reinforcing layer thus formed is adhesively bonded to the restricting layer. The steel plate reinforcing sheet is produced in this manner.

The reinforcing layer thus produced has a thickness for example in the range of 0.2-3.0 mm, or preferably in the range of 0.5-1.3 mm.

Figure 1:
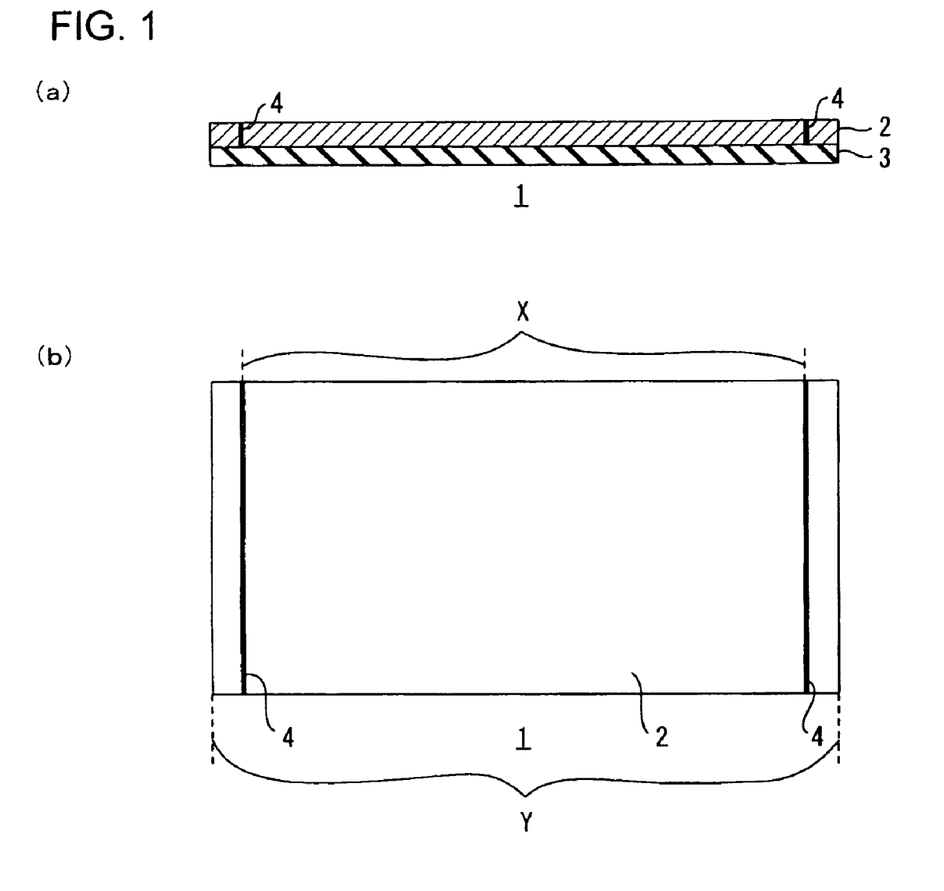
FIG. 1 shows an embodiment of a steel plate reinforcing sheet of the present invention, (a) showing a sectional view of the steel plate reinforcing sheet, taken along a direction of the opposite end portions where slits are formed being opposite to each other, and (b) showing a plan view of the same.
Figure 2:
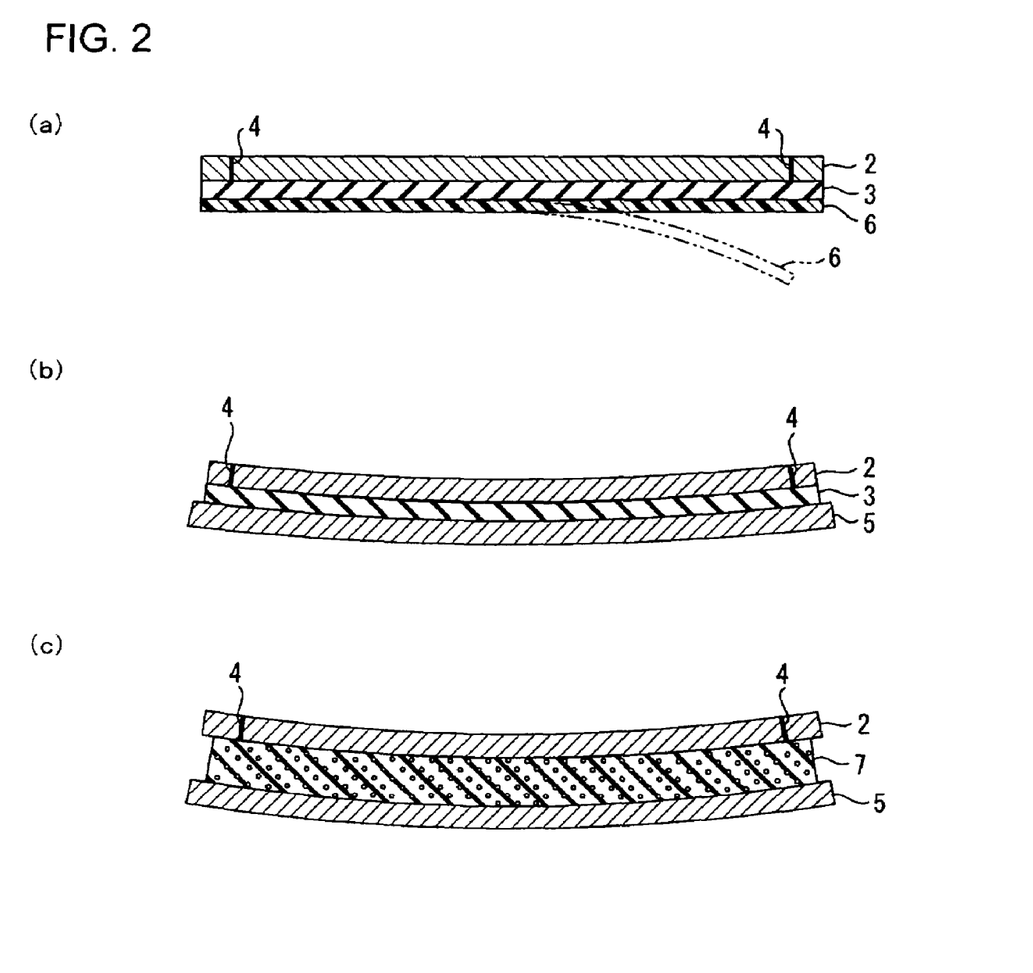
FIG. 2 is a process drawing showing an embodiment of a method of reinforcing a steel plate by using the steel plate reinforcing sheet shown in FIG. 1.

The steel plate reinforcing sheet thus produced has the restricting layer 2 and the reinforcing layer 3 laminated thereon, as shown in FIG. 1(a). This steel plate reinforcing sheet 1 is cut in accordance with the form of the steel plate 5 to be reinforced (See FIG. 2). For example, it is formed in a generally rectangular shape as viewed from top, as shown in FIG. 1(b).

Then, slits 4 are formed in both end portions of the restricting layer 2 of the steel plate reinforcing sheet 1. The end portions of the restricting layer 2 are defined here as the opposite end portions of the steel plate reinforcing sheet 1 formed in a generally rectangular shape as viewed from top (one pair of opposite end portions of two pairs of opposite end portions displaced from each other at substantially 90° in the steel plate reinforcing sheet 1 having the generally rectangular shape as viewed from top) which are locations at which the opposite end portions of the steel plate reinforcing sheet 1 are to be located when the steel plate reinforcing sheet 1 is arranged along the curving direction to be adhesively bonded to the curved steel plate 5, as mentioned later.

To be more specific, the slits 4 are formed in the opposite end portions of the steel plate reinforcing sheet 1 to extend over an entire length of the steel plate reinforcing sheet 1 with respect to a direction substantially orthogonal to a direction in which the both end portions of the steel plate reinforcing sheet 1 confront each other (with respect to a direction substantially orthogonal to a curving direction of the steel plate reinforcing sheet 1 when adhesively bonded to the curved steel plate 5), so that a length X defined between the slits 4 (a dimension between the slits 4 which extends parallel to a dimension extending in the direction in which the end portions confront each other) can be usually in the range of 40% or more (XYx100≧40), preferably 50% or more (X/Yx100≧50), or further preferably 60% or more (X/Yx100≧60), and 90% or less, of a total length Y of the steel plate reinforcing sheet 1 with respect to the direction parallel to the length between the slits 4.

When the slits 4 are formed so that the length X defined between the slits 4 can be less than 40% of the total length Y of the steel plate reinforcing sheet 1 with respect to the direction parallel to the length between the slits 4, the stress concentrated on the end portions of the steel plate reinforcing sheet is not fully relieved therefrom and thus deformed when the reinforcing layer 3 foamed is cooled.

No particular limitation is imposed on the formation of the slits 4. The slits 4 may be formed by a known cutting method using a cutter and the like.

No particular limitation is imposed on the depth of the slits 4. For example, the slits 4 may be formed to extend through the restricting layer 2. Preferably, the slits 4 are formed to have a depth of one-third or more of the thickness of the restricting layer 2.

Also, no particular limitation is imposed on the width of the slits 4. For example, the slits 4 are formed to be 20 mm or less, preferably 10 mm or less, or further preferably 5 mm or less.

As long as the slits 4 can be formed to extend over the entire length of the steel plate reinforcing sheet 1 with respect to the above-said direction, the slits 4 may be formed in various shapes as viewed from top, including a wave-shape, a saw-tooth shape, a tapered shape, and a recessed shape, as well as a parallel-lines shape shown in FIG. 1(b), without being limited to any particular shape. Also, as long as the slits 4 can be formed to extend over the entire length of the steel plate reinforcing sheet 1 with respect to the above-said direction, the slits 4 are not necessarily formed to extend along the above-said direction accurately, but may be formed to extend along a direction intersecting with the above-said direction.

In the embodiment wherein the slits 4 are formed to extend along the direction intersecting with the above-said direction so that a large length (long dimension) X and a small length (short dimension) X are formed between the slits 4, those slits 4 are formed so that the smallest length (shortest dimension) X is 40% or more of the total length Y of the steel plate reinforcing sheet 1 with respect to the direction parallel to the length between the slits 4.

Also, although the two slits 4 formed in the end portions of the steel plate reinforcing sheet 1 may be identical with or different from each other in shape, those two slits 4 are preferably formed to have a symmetrical shape.

Further, as long as the slits 4 can be formed so that the length X defined between the slits 4 can be 40% or more of the total length Y of the steel plate reinforcing sheet 1 with respect to the direction parallel to the length between the slits 4, two or more slits 4 may be formed in each of the end portions. For example, when the two or more slits 4 are formed near the ends of the steel plate reinforcing sheet 1, the stress concentrated on the end portions can be relieved from the end portions further effectively.

In the embodiment wherein the two or more slits 4 are formed in the each end portion, those slits 4 are formed so that a length X defined between the slits 4 confront each other across a center of the steel plate reinforcing sheet 1 extending parallel to the length between the slits 4 can be 40% or more of the total length Y of the steel plate reinforcing sheet 1 with respect to the direction parallel to the length between the slits 4.

The arrangement, depth, width, shape, etc. of the slits 4 mentioned above are specifically determined within the range mentioned above, depending on the material and shape of the steel plate 5 to which the steel plate reinforcing sheet 1 is adhesively bonded.

In use, the steel plate reinforcing sheet 1 thus configured is adhesively bonded to the steel plate 5 used in a variety of industrial machines, such as transportation machines, to reinforce the steel plate 5.

To be more specific, the steel plate reinforcing sheet 1 of the present invention is formed by laminating the reinforcing layer 3 on the restricting layer 2 and, if desired, the exfoliate paper 6 is adhesively bonded to the surface of the reinforcing layer 3, as shown in FIG. 2(a). In use, the exfoliate paper 6 is stripped from the surface of the reinforcing layer 3, as indicated by a phantom line, first. Then, the surface of the reinforcing layer 3 is adhesively bonded to the steel plate 5, as shown in FIG. 2(b). Thereafter, the resulting lamination is heated at a prescribed temperature (e.g. 160-210° C.) to foam, to crosslink, and to cure the lamination, to thereby form the foam layer 7, as shown in FIG. 2(c).

The steel plate reinforcing sheet of the present invention includes the slits described above. This arrangement can produce the result that for example when the steel plate reinforcing sheet is adhesively bonded to the curved steel plate so that the slits extend along a direction substantially orthogonal to the curving direction of the curved steel plate and then the reinforcing layer is foamed, in order to reinforce the curved steel plate, the slits can allow the stress concentrated on the end portions of the steel plate reinforcing sheet to be relieved from those end portions when cooled. As a result, even when the steel plate reinforcing sheet is applied to the curved steel plate, abrupt deformation of the end portions of the steel plate reinforcing sheet with respect to the direction extending along the curving direction of the curved steel plate can be prevented. This can provide reduction of distortions of the steel plate, while providing the reliable reinforcement.

Also, the steel plate reinforcing sheet of the present invention has a simple structure that the slits are simply formed in the end portions of the steel plate reinforcing sheet to extend over the entire length of the steel plate reinforcing sheet with respect to the direction substantially orthogonal to the direction in which the end portions confront each other. This can provide the advantage of preventing reduction in reinforcing property of the steel plate reinforcing sheet, while reducing distortions of the steel plate, thus providing significant improvement in surface rigidity of the steel plate.

Thus, the steel plate reinforcing sheet of the present invention can provide reliable reinforcement, while preventing abrupt deformations of the end portions of the steel plate reinforcing sheet with respect to the direction extending along the curving direction of the curved steel plate by being simply adhesively bonded to the curved steel plate such as the door panel of the automotive vehicle.

When this steel plate reinforcing sheet is used to reinforce a curved steel panel, the steel plate reinforcing sheet is adhesively bonded to the steel panel, first, in an assembling process of the steel panel of the shell of the automobile, for example. Then, the steel plate reinforcing sheet is thermally foamed, cross-linked and cured by using the heat generated at the time of the electrodeposition coating, to thereby form the foam layer.

EXAMPLES

While in the following, the present invention will be described in further detail with reference to Examples and Comparative Examples, the present invention is not limited to any of them.

Production of Laminated Sheet 50 parts by weight of styrene-butadiene random copolymer (240,000 in number average molecular weight, 25 weight % styrene content, and 35 in Mooney viscosity (ML1+4, at 100° C.), 50 parts by weight of semisolid bisphenol A type epoxy resin (250 g/equiv. in epoxy equivalent), 10 parts by weight of epoxy-modified styrene•butadiene•styrene block copolymer (40 weight % styrene content, and 1,067 g/equiv. in epoxy equivalent, (EPOFRIEND® AT501 available from DAICEL CHEMICAL INDUSTRIES, LTD.), 50 parts by weight of heavy calcium carbonate, 50 parts by weight of talc, 10 parts by weight of terpene-aromatic liquid resin, and 30 parts by weight of C5/C9 petroleum resin were kneaded at 130° C.

Thereafter, 2 parts by weight of 4,4'-oxybis(benzene sulfonyl hydrazide), 10 parts by weight of sulfur, 5 parts by weight of dicyandiamide, 5 parts by weight of zinc oxide, and 5 parts by weight of dibenzothiazyl disulfide (cross-linking accelerator) were mixed in the kneaded material and kneaded at 20° C. The resulting kneaded material was rolled into a sheet form of 0.6 mm thick by using a calendar roll, to form the reinforcing layer 3. Then, a glass fiber cloth of 0.2 mm thick serving as the restricting layer 2 was adhesively bonded to the reinforcing layer 3. The laminated sheet was produced in this manner.

Example 1

Figure 3:
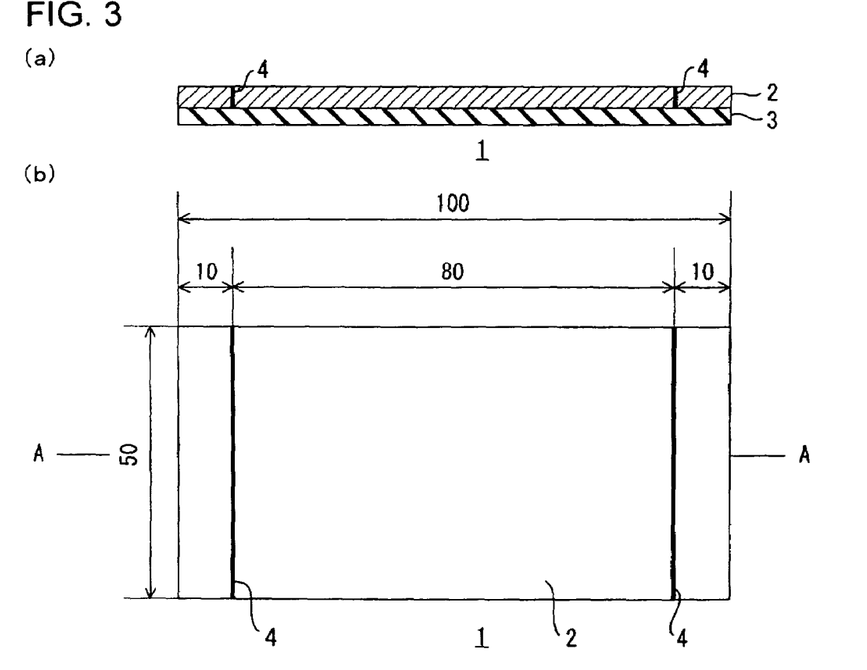

The laminated sheet produced in the manner described above was cut to a rectangular form of 100 mm wide and 50 mm long, as shown in FIG. 3(b). Then, two slits 4 having a width of 0.05 mm were formed in both widthwise end portions of the laminated sheet with a cutter, to extend through the restricting layer 2 in a thickness direction thereof, as shown in FIG. 3(a), to thereby produce the steel plate reinforcing sheet 1.

The slits 4 were formed, at locations 10 mm widthwise inward from the both widthwise ends of the steel plate reinforcing sheet 1, to extend over the entire length thereof in the longitudinal direction, respectively, so as to be a symmetric and parallel-lines form as viewed from top, as shown in FIG. 3(b). In this steel plate reinforcing sheet 1, a widthwise length defined between the slits 4 was set to be 80% of a total widthwise length of the steel plate reinforcing sheet 1 throughout the entire longitudinal dimension thereof.

Example 2

Figure 4:
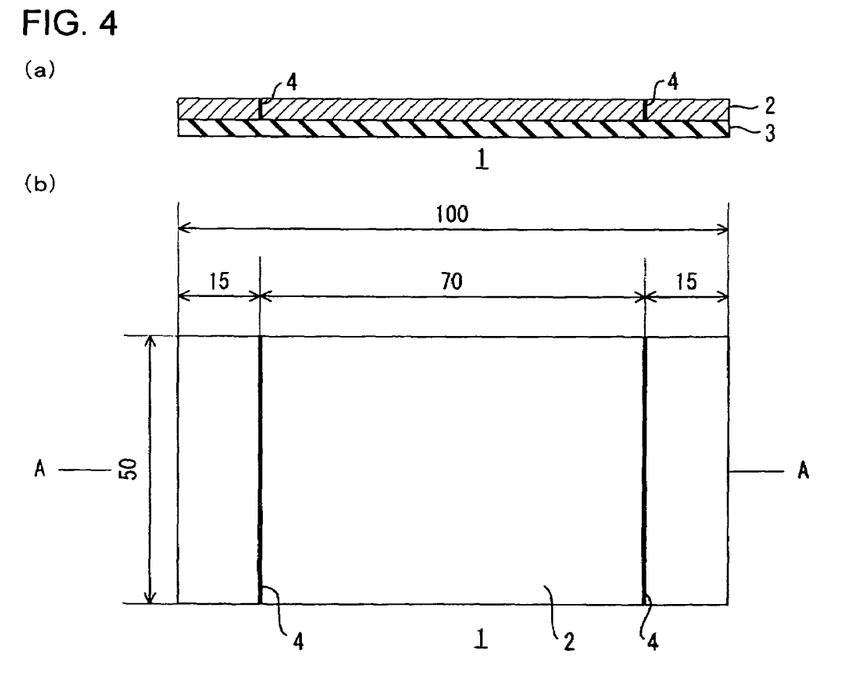

The laminated sheet produced in the manner described above was cut to a rectangular form of 100 mm wide and 50 mm long, as shown in FIG. 4(b). Then, two slits 4 having a width of 0.05 mm were formed in both widthwise end portions of the laminated sheet with the cutter, to extend through the restricting layer 2 in a thickness direction thereof, as shown in FIG. 4(a), to thereby produce the steel plate reinforcing sheet 1.

The slits 4 were formed, at locations 15 mm widthwise inward from the both widthwise ends of the steel plate reinforcing sheet 1, to extend over the entire length thereof in the longitudinal direction, respectively, so as to be a symmetric and parallel-lines form as viewed from top, as shown in FIG. 4(b). In this steel plate reinforcing sheet 1, a widthwise length defined between the slits 4 was set to be 70% of a total widthwise length of the steel plate reinforcing sheet 1 throughout the entire longitudinal dimension thereof Example 3

Figure 5:
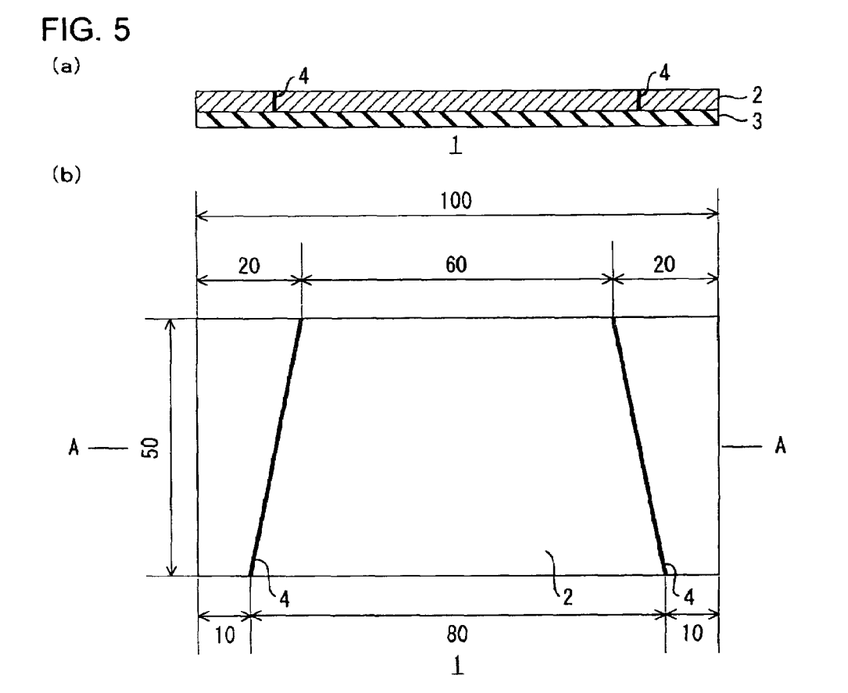

The laminated sheet produced in the manner described above was cut to a rectangular form of 100 mm wide and 50 mm long, as shown in FIG. 5(b). Then, two slits 4 having a width of 0.05 mm were formed in both widthwise end portions of the laminated sheet with the cutter, to extend through the restricting layer 2 in a thickness direction thereof, as shown in FIG. 5(a), to thereby produce the steel plate reinforcing sheet 1.

The slits 4 were formed to extend between locations on one lengthwise side of the steel plate reinforcing sheet 1 10 mm widthwise inward from the both widthwise ends thereof and related locations on the other lengthwise side thereof 20 mm widthwise inward from the both widthwise ends thereof, to extend over the entire length thereof in the longitudinal direction, respectively, so as to be a symmetric and tapered form as viewed from top, as shown in FIG. 5(b). In this steel plate reinforcing sheet 1, a narrowest (shortest) widthwise dimension defined between the slits 4 (the widthwise dimension between both ends thereof on the other lengthwise side) was set to be 60% of a total widthwise length of the steel plate reinforcing sheet 1. Also, a widest (longest) widthwise dimension defined between the slits 4 (the widthwise dimension between both ends thereof on the one lengthwise side) was set to be 80% of the total widthwise length of the steel plate reinforcing sheet 1.

Example 4

Figure 6:
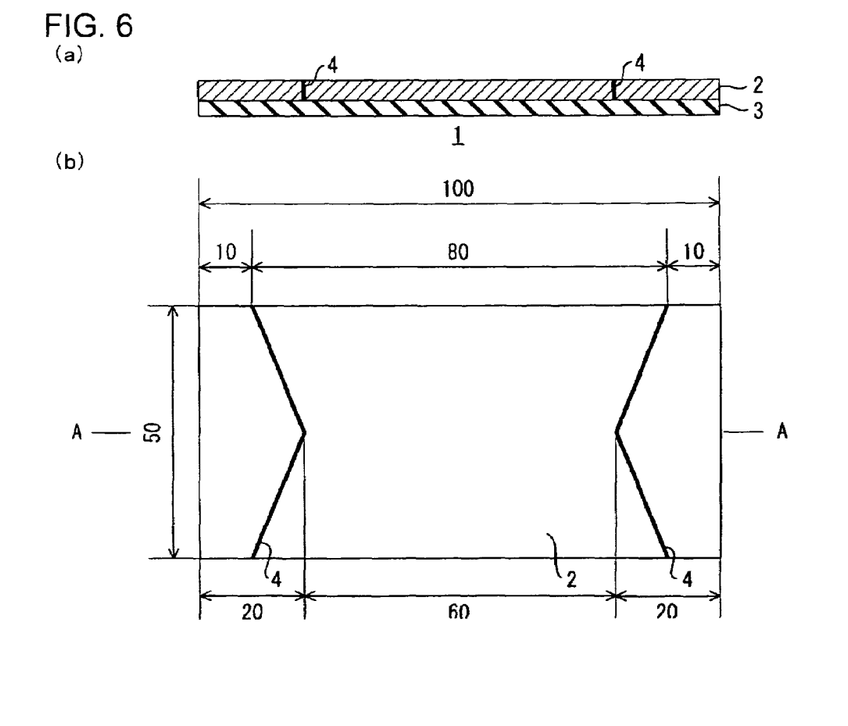

The laminated sheet produced in the manner described above was cut to a rectangular form of 100 mm wide and 50 mm long, as shown in FIG. 6(b). Then, two slits 4 having a width of 0.05 mm were formed in both widthwise end portions of the laminated sheet with the cutter, to extend through the restricting layer 2 in a thickness direction thereof, as shown in FIG. 6(a), to thereby produce the steel plate reinforcing sheet 1.

The slits 4 were formed to extend between locations on one lengthwise side of the steel plate reinforcing sheet 1 10 mm widthwise inward from the both widthwise ends thereof and related locations on the other lengthwise side thereof 20 mm widthwise inward from the both widthwise ends thereof, to extend over the entire length thereof in the longitudinal direction, respectively, so as to be a symmetric and recessed form as viewed from top, as shown in FIG. 6(b). In this steel plate reinforcing sheet 1, a narrowest (shortest) widthwise dimension defined between the slits 4 (the widthwise dimension between both lengthwise center portions thereof on one lengthwise side) was set to be 60% of a total widthwise length of the steel plate reinforcing sheet 1. Also, a widest (longest) widthwise dimension defined between the slits 4 (the widthwise dimension between both lengthwise ends thereof on the other lengthwise side) was set to be 80% of the total widthwise length of the steel plate reinforcing sheet 1.

Comparative Example 1

Figure 7:
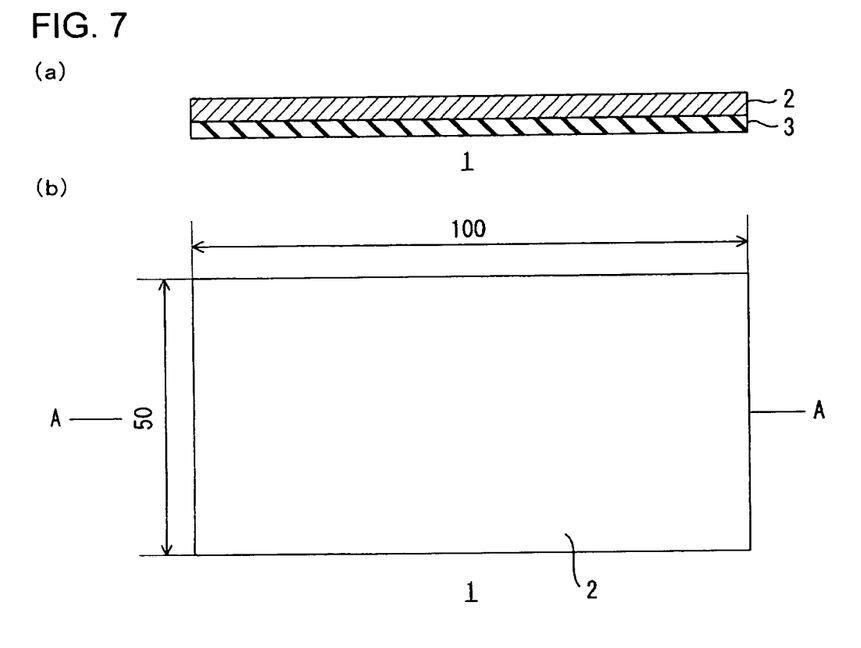
FIG. 7 shows the steel plate reinforcing sheet of Comparative Example 1, (a) showing a sectional view of the steel plate reinforcing sheet, taken along a direction of the opposite end portions where slits are formed being opposite to each other (or a sectional view taken along line A-A of (b)), and (b) showing a plan view of the same.

The laminated sheet produced in the manner described above was merely cut to a rectangular form of 100 mm wide and 50 mm long, as shown in FIG. 7(b) and no slits were formed, as shown in FIG. 7(a), thereby producing the steel plate reinforcing sheet 1.

Comparative Example 2

Figure 8:
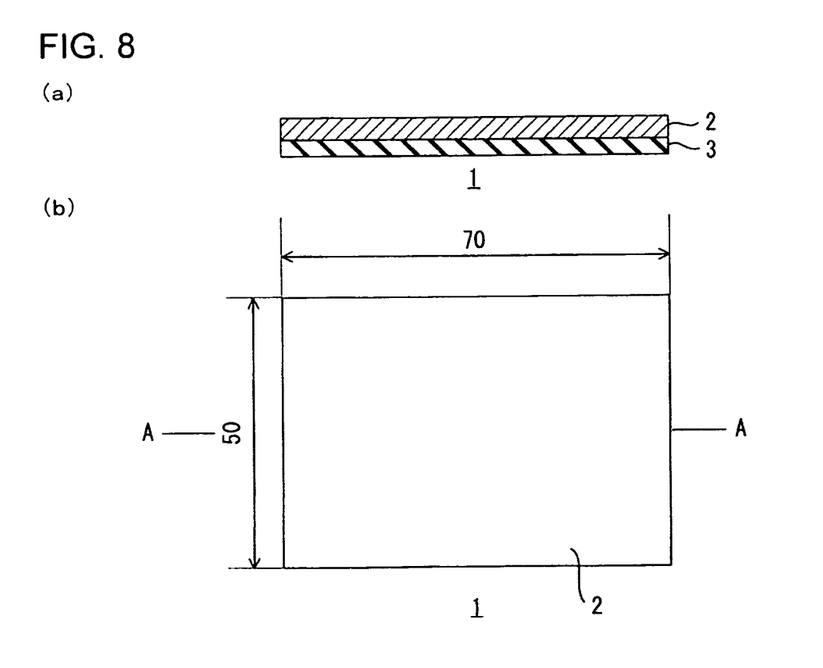
FIG. 8 shows the steel plate reinforcing sheet of Comparative Example 2, (a) showing a sectional view of the steel plate reinforcing sheet, taken along a direction of the opposite end portions where slits are formed being opposite to each other (or a sectional view taken along line A-A of (b)), and (b) showing a plan view of the same.

The laminated sheet produced in the manner described above was merely cut to a rectangular form of 70 mm wide and 50 mm long, as shown in FIG. 8(b) and no slits were formed, as shown in FIG. 8(a), thereby producing the steel plate reinforcing sheet 1.

Comparative Example 3

Figure 9:
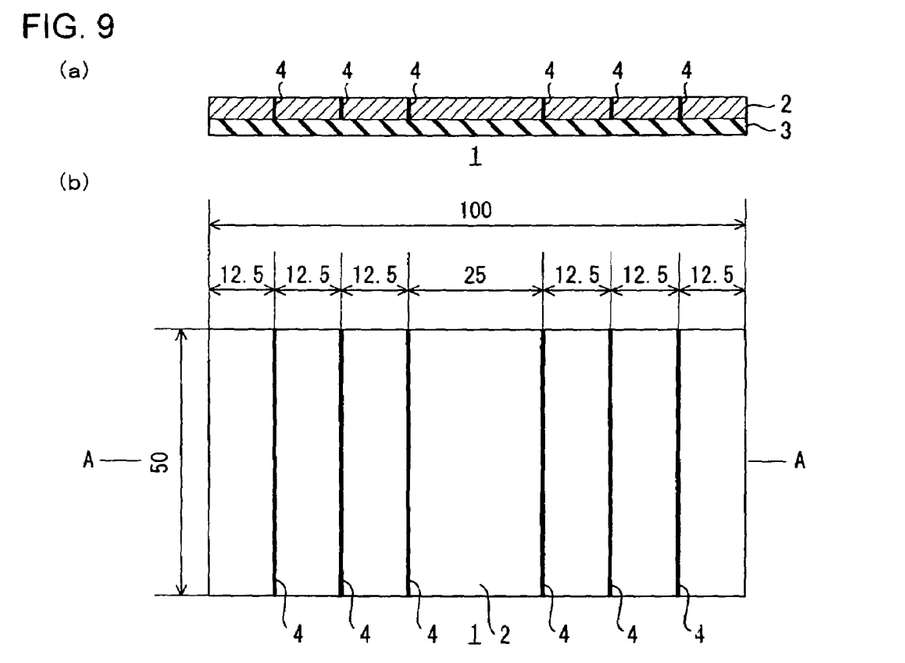
FIG. 9 shows the steel plate reinforcing sheet of Comparative Example 3, (a) showing a sectional view of the steel plate reinforcing sheet, taken along a direction of the opposite end portions where slits are formed being opposite to each other (or a sectional view taken along line A-A of (b)), and (b) showing a plan view of the same.

The laminated sheet produced in the manner described above was cut to a rectangular form of 100 mm wide and 50 mm long, as shown in FIG. 9(b) and six slits 4 having a width of 0.05 mm were formed with the cutter, to extend through the restricting layer 2 in a thickness direction thereof, as shown in FIG. 9(a), to thereby produce the steel plate reinforcing sheet 1.

The slits 4 were formed, at three equally spaced locations 12.5 mm widthwise inward from the both widthwise ends of the steel plate reinforcing sheet 1, to extend over the entire length thereof in the longitudinal direction, respectively, so as to be a symmetric and parallel-lines form as viewed from top, as shown in FIG. 9(b). In this steel plate reinforcing sheet 1, a widthwise length defined between the slits 4 confronting each other across a widthwise center thereof was set to be 25% of a total widthwise length of the steel plate reinforcing sheet 1 throughout the entire longitudinal dimension thereof.

Comparative Example 4

Figure 10:
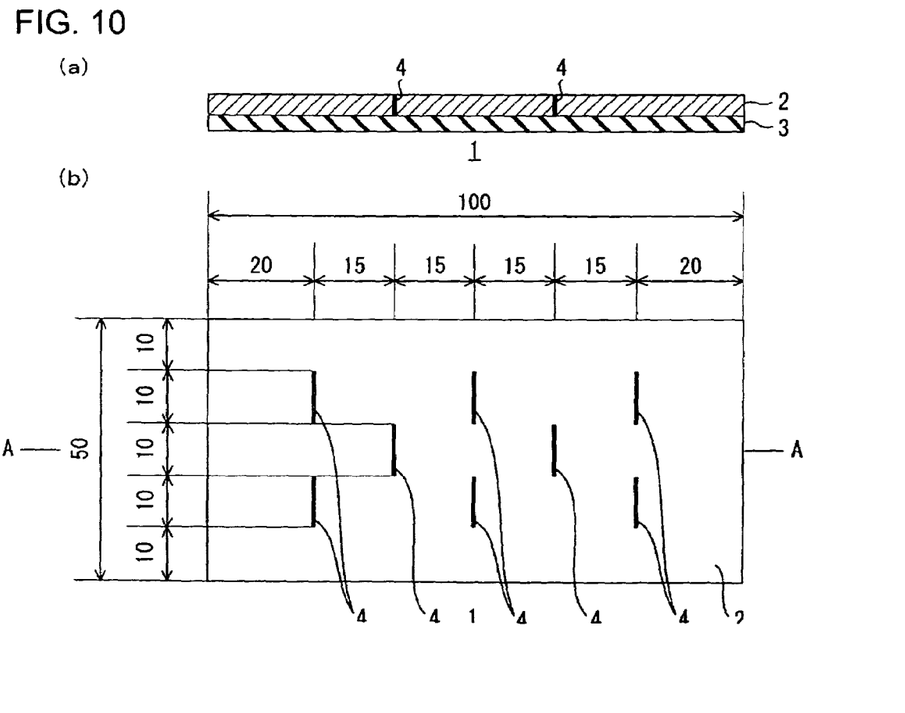

The laminated sheet produced in the manner described above was cut to a rectangular form of 100 mm wide and 50 mm long, as shown in FIG. 10(b) and a plurality of (eight) slits 4 having a width of 0.05 mm were formed with the cutter, to extend through the restricting layer 2 in a thickness direction thereof, as shown in FIG. 10(a), to thereby produce the steel plate reinforcing sheet 1.

The staggered slits 4, each having a lengthwise dimension of 10 mm, were formed at locations 20 mm widthwise inward from the both widthwise ends of the steel plate reinforcing sheet 1 and at locations spaced therefrom at intervals 15 mm widthwise inward therefrom, as shown in FIG. 10(b).

Evaluation

Figure 11:
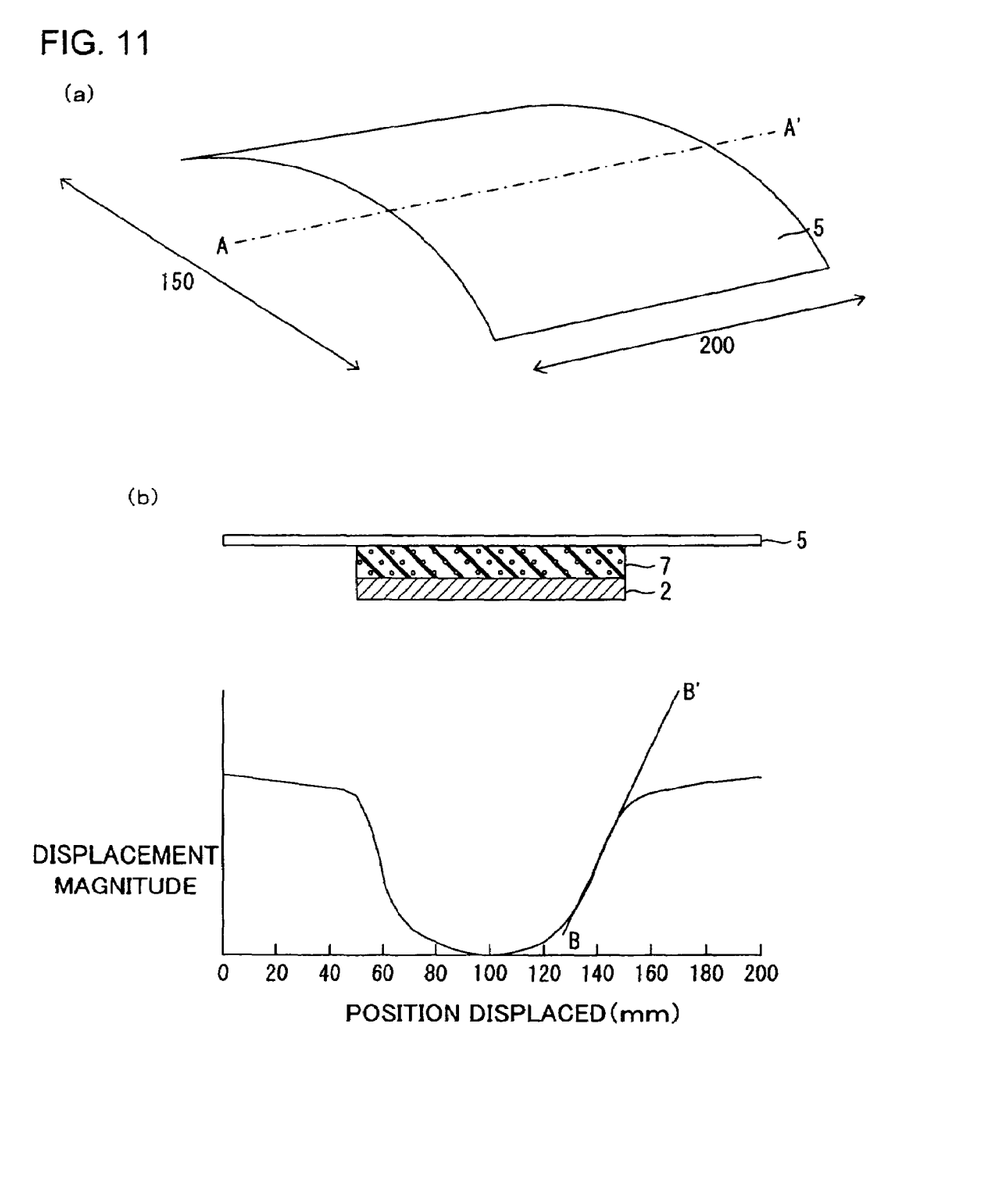

A curved aluminum panel (A1050) having a thickness of 0.3 mm and a radius of curvature of 250 mm was used as an adherend 5, as shown in FIG. 11(a). The steel plate reinforcing sheets 1 produced in Examples and Comparative Examples were each adhesively bonded to the adherend 5 at a center portion thereof on the concave side so that the slits 4 extended along a direction substantially orthogonal to the curving direction of the adherend 5. Then, the reinforcing layer 3 of the each steel plate reinforcing sheet 1 was foamed and cured by heating at 180° C. for twenty minutes, to form the foamed layer 7. Thereafter, the resultant ones were allowed to stand at room temperature for 24 hours and thereafter the deformations and surface strength of the adherend 5 were measured.

Measurement of Displacement

The adherend 5 was put on an X-Y stage of a laser displacement gauge (LT-8120 available from Keyence Corporation) to measure vertical displacement of the adherend 5 with respect to the curving direction thereof The displacement of the adherend 5 starts from the end portion of the steel plate reinforcing sheet 1. In the measurement, displacements of the adherend 5 were calculated for each 10 mm with respect to the measuring direction taken along line B-B of FIG. 11(b) and the measured displacements of the adherend 5 were defined as the displacements at end portions of the steel plate reinforcing sheet 1. The displacements thus measured are shown in TABLE 1.

Measurement of Surface Strength

After four sides of the adherend 5 were fixed with jigs using a stress measurement device (AGS-100D Type available from Shimadzu Corporation), the adherend 5 was indented 3 mm at a center thereof on the convex side. The compressive loads obtained were measured by a load cell (SBL-1 kN). The indentation loads (compressive loads) are shown in TABLE 1. The indentation speed was 50 mm/min. and a rubber ball of φ11 mm (a rubber hardness of 70) was used as an indenter. In TABLE 1, the indentation loads of the aluminum panel only are shown, for reference purpose.

TABLE 1

| | Example 1 | Example 2 | Example 3 | Example 4 | Compara. Ex. 1 | Compara. Ex. 2 | Compara. Ex. 3 | Compara. Ex. 4 | Alminum panel |
|---|---|---|---|---|---|---|---|---|---|
| Displacement (μm) | 31.2 | 14.0 | 29.7 | 28.0 | 40.3 | 31.5 | 8.1 | 37.8 | / |
| Indentation load (N) | 28.5 | 28.8 | 28.6 | 28.7 | 29.5 | 27.0 | 26.9 | 26.9 | 10.2 |

While the illustrative embodiments of the present invention are provided in the above description, such is for illustrative purpose only and it is not to be construed restrictively. Modification and variation of the present invention that will be obvious to those skilled in the art is to be covered by the following claims.

The disclosure of Japanese patent application Ser. No. 2004-172912, filed on Jun. 10, 2004, is incorporated herein by reference.

What is claimed is:

1. A steel plate reinforcing sheet in order to be bonded to a steel plate;
   wherein the steel plate reinforcing sheet features a generally rectangular shape, as defined by a length and a width, and two end portions on either side of an imaginary line which bisects the length of the steel plate reinforcing sheet;
      wherein the steel plate reinforcing sheet is a laminate comprising a restricting layer and a reinforcing layer;
      wherein the restricting layer comprises at least two slits;
      wherein each end portion of the restricting layer comprises at least one slit; wherein each slit extends directly or indirectly across the entire width of the steel plate reinforcing sheet; and wherein the two slits closest to the imaginary line define a minimum distance between slits, said minimum distance being parallel to the length of the steel plate reinforcing sheet and equivalent to 40% or more of the length of the steel plate reinforcing sheet.

2. The steel plate reinforcing sheet according to claim 1, wherein said minimum distance is equivalent to 50% or more of the length of the steel plate reinforcing sheet.

3. The steel plate reinforcing sheet according to claim 1, wherein said minimum distance is equivalent to 60% or more of the length of the steel plate reinforcing sheet.

4. The steel plate reinforcing sheet according to claim 1, wherein the reinforcing layer is in the form of a sheet of foaming composition which is foamed by heating, the foaming composition comprises rubber, an epoxy resin and a foaming agent.

5. The steel plate reinforcing sheet according to claim 4, wherein the rubber is styrene synthetic rubber.

6. The steel plate reinforcing sheet according to claim 5, wherein the styrene synthetic rubber is styrene butadiene rubber.

7. The steel plate reinforcing sheet according to claim 4, wherein the mixing ratio of the epoxy resin is in the range of 30-70 parts by weight per 100 parts by weight of the total of the rubber and the epoxy resin.

8. The steel plate reinforcing sheet according to claim 4, wherein the foaming composition further includes a compatibilizing agent, and the compatibilizing agent is epoxy-modified rubber.

9. The steel plate reinforcing sheet according to claim 8, wherein the mixing ratio of the compatibilizing agent is in the range of 1-20 parts by weight per 100 parts by weight of the total of the rubber and the epoxy resin.

10. The steel plate reinforcing sheet according to claim 1, wherein the slits have depths of one-third or more of the thickness of the restricting layer.

11. The steel plate reinforcing sheet according to claim 1, wherein the slits have widths of 20 mm or less.

12. The steel plate reinforcing sheet according to claim 1, wherein the at least two slits, at least one slit in each end portion, together define a shape selected from a parallel-lines shape, a wave-shape, a saw-tooth shape, a tapered shape, or a recessed shape, as viewed from top of the restricting layer.

13. The steel plate reinforcing sheet according to claim 12, wherein the shape is the tapered shape, as viewed from top of the restricting layer.

14. The steel plate reinforcing sheet according to claim 12, wherein the shape is the recessed shape, as viewed from top of the restricting layer.

15. The steel plate reinforcing sheet according to claim 1, wherein the at least two slits, at least one slit in each end portion, are formed to have a symmetrical shape.

16. The steel plate reinforcing sheet according to claim 1, wherein a surface of the reinforcing layer is adhesively bonded to the steel plate.

17. The steel plate reinforcing sheet according to claim 16, wherein the steel plate is curved.

* * * * *